(12) United States Patent
Malmborg et al.

(10) Patent No.: US 10,989,266 B2
(45) Date of Patent: Apr. 27, 2021

(54) SOFT OPENING 2-WAY VALVE ARRANGEMENT FOR A SHOCK ABSORBER

(71) Applicant: OHLINS RACING AB, Upplands Väsby (SE)

(72) Inventors: Håkan Malmborg, Norrahammar (SE); Fredrik Larsson, Jönköping (SE)

(73) Assignee: ÖHLINS RACING AB, Upplands Väsby (SE)

( * ) Notice: Subject to any disclaimer, the term of this patent is extended or adjusted under 35 U.S.C. 154(b) by 165 days.

(21) Appl. No.: 16/078,411

(22) PCT Filed: Feb. 21, 2017

(86) PCT No.: PCT/EP2017/053892
§ 371 (c)(1),
(2) Date: Aug. 21, 2018

(87) PCT Pub. No.: WO2017/144444
PCT Pub. Date: Aug. 31, 2017

(65) Prior Publication Data
US 2019/0048965 A1    Feb. 14, 2019

(30) Foreign Application Priority Data

Feb. 22, 2016  (EP) .................................. 16156682

(51) Int. Cl.
*F16F 9/348* (2006.01)
*F16F 9/46* (2006.01)
(Continued)

(52) U.S. Cl.
CPC .............. *F16F 9/348* (2013.01); *B60G 13/08* (2013.01); *B60G 17/08* (2013.01); *F16F 9/19* (2013.01);
(Continued)

(58) Field of Classification Search
CPC ...... F16F 9/348; F16F 9/34; F16F 9/19; F16F 9/48; F16F 9/469; F16F 9/466;
(Continued)

(56) References Cited

U.S. PATENT DOCUMENTS 5,226,512 A    7/1993  Issei
5,647,461 A *  7/1997  Jensen .................... F16F 9/34
                                                  188/317
(Continued)

FOREIGN PATENT DOCUMENTS

CN         105339700 A    2/2016
EP         0942195 B1     7/2008
(Continued)

OTHER PUBLICATIONS

International Search Report for International Application No. PCT/EP2017/053892, dated May 26, 2017 (3 pages).
(Continued)

*Primary Examiner* — Umashankar Venkatesan
*Assistant Examiner* — Andrew J Rost
(74) *Attorney, Agent, or Firm* — Kagan Binder, PLLC

(57) ABSTRACT

Valve arrangement for a shock absorber is described, comprising a valve housing (2) having a first (7) and a second port (8), a pilot chamber (3) being in fluid communication with the first (7) and/or second port (8), wherein a pilot pressure (Pp) is defined by a hydraulic pressure in the pilot chamber (3). The arrangement further comprises a main valve member (4) being axially movably arranged in the valve housing (2) and being arranged to interact with a main valve seat member (9) in order to restrict a main fluid flow between the first (7) and second ports (8) in response to the pilot pressure (Pp) acting on the main valve member (4). Moreover, the main valve seat member (9) is movable between a first compression stroke position and a second
(Continued)

rebound stroke position so that, during the compression stroke, the main fluid flow is restricted at a first restriction (R1) and a cooperating serially arranged second restriction (R2), and during the rebound stroke, the main fluid flow is restricted at a third restriction (R3).

16 Claims, 6 Drawing Sheets

(51) Int. Cl.
    *B60G 13/08*     (2006.01)
    *B60G 17/08*     (2006.01)
    *F16F 9/48*     (2006.01)
    *F16F 9/19*     (2006.01)
    *F16F 9/34*     (2006.01)
    *G05D 16/16*     (2006.01)

(52) U.S. Cl.
    CPC ............... *F16F 9/34* (2013.01); *F16F 9/465* (2013.01); *F16F 9/466* (2013.01); *F16F 9/469* (2013.01); *F16F 9/48* (2013.01); *G05D 16/16* (2013.01); *B60G 2206/41* (2013.01); *B60G 2500/112* (2013.01); *B60G 2800/162* (2013.01); *F16F 2228/066* (2013.01)

(58) Field of Classification Search
    CPC .... F16F 9/465; F16F 2228/066; G05D 16/16; B60G 17/08; B60G 13/08; B60G 2800/162; B60G 2500/112; B60G 2206/41

See application file for complete search history.

(56) References Cited

U.S. PATENT DOCUMENTS

| | | | |
|---|---|---|---|
| 6,290,035 B1 * | 9/2001 | Kazmirski | ................ F16F 9/34 188/282.5 |
| 9,599,183 B2 * | 3/2017 | Kamakura | .............. F16F 9/465 |
| 2013/0341540 A1 | 12/2013 | Manger et al. | |

FOREIGN PATENT DOCUMENTS

| | | |
|---|---|---|
| EP | 2792901 A1 | 10/2014 |
| EP | 2792902 A1 | 10/2014 |
| JP | H09217778 A | 8/1997 |
| WO | 2010122102 A1 | 10/2010 |
| WO | 2017144445 A1 | 8/2017 |

OTHER PUBLICATIONS

Extended European Search Report for Application No. 16156682.3, dated Aug. 25, 2016 (9 pages).

* cited by examiner

SOFT OPENING 2-WAY VALVE ARRANGEMENT FOR A SHOCK ABSORBER

CROSS-REFERENCE TO RELATED APPLICATIONS application claims priority to International Application No, PCT/EP2017/053892, filed Feb. 21, 2017 and titled "SOFT OPENING 2-WAY VALVE ARRANGEMENT FOR. A SHOCK ABSORBER," which in turn claims priority from European Application having Ser. No. 16156682.3, filed Feb. 22, 2016 and titled "SOFT OPENING 2-WAY VALVE ARRANGEMENT FOR A SHOCK ABSORBER," both of which are incorporated herein by reference in their entireties.

TECHNICAL FIELD OF THE INVENTION

The present invention generally relates to the field of valve arrangements. In particular, the present invention relates to a valve arrangement for controlling a flow of damping medium in a shock absorber.

TECHNICAL BACKGROUND

Generally, within the technical field of shock absorbers that include pilot valves, a pressure regulator, i.e. a valve arrangement, is used to control a flow of damping medium between a compression chamber and a rebound chamber during a reciprocal motion of a piston in a damping medium filled chamber of the shock absorber. The piston, via a piston rod, is connected either to a wheel or a chassis, whereas the chamber is connected to one of the wheel or chassis that the piston is not connected to. During a compression stroke the piston moves axially in a direction towards the compression chamber and thereby pressurizes the damping medium in the compression chamber. During a rebound stroke, the piston moves axially towards the rebound chamber, i.e. in the opposite direction, and thereby pressurizes the damping medium in the rebound chamber. In accordance with the function of the shock absorber, the pressurized damping medium needs to be transferred from the pressurized chamber to the other chamber, i.e. from the compression chamber to the rebound chamber or vice versa. The flow of damping medium needs to be controlled to obtain a damping effect of the piston and thus the shock absorber, i.e. to damp relative motion between the wheel and chassis.

The control of the pressure in the flow of damping medium in the shock absorber depends on the pressure created by the pilot control valve. Pressure regulators in shock absorbers are usually provided with an axially movable or deflectable valve member, such as a washer, cone or shim that acts against a seat part. The pressure control is achieved by equilibrium or balance of forces, for example equilibrium between a pressure and/or flow force acting on the valve member in one direction and counteracting or opposing forces, such as one or more of a spring force, friction force or pilot pressure force acting on the valve member in the opposite direction. When the piston of the shock absorber moves at a certain speed such that the pressure and/or flow force become greater than the opposing or counteracting forces, the movable valve member is forced away from the seat part, thereby opening a flow passage. Thus, the movable valve member is forced to open at a stroke defined as a function of the flow produced by the pressure acting on the regulating area of the pressure regulator.

Traditional valve arrangements of the pressure regulating type described above generally have the disadvantage that when a threshold value of pressure is reached, the valve member is opened and the flow of damping medium between the compression chamber and the rebound chamber dramatically increased in a distinct way. This gives a damping characteristic which is not as smooth as desired. Instead, such a damping has a sharp opening with a corner that acts to dynamics that commonly causes instabilities such as an initial overshot and following oscillations.

State of the art valve arrangements for shock absorbers, such as the one shown in EP0942195B1, have a valve construction that allows a soft opening, providing the desired damping characteristics. However, although this solution provides a soft opening in one flow direction, the damping flow in the opposite direction is not at all desirable. Thus, this solution works well in a 1-way valve, but it does not provide the desired damping characteristics in a 2-way valve.

Therefore, there is a need for a 2-way valve arrangement for use in shock absorbers having improved damping characteristics.

SUMMARY OF THE INVENTION

An object of the present invention is to provide an improved 2-way valve arrangement providing improved damping characteristics which are smoother than prior art.

The invention is based on the inventors' insight that in order for a 2-way valve arrangement to have soft opening characteristics the valve arrangement needs restricting interfaces that are different in compression stroke compared to rebound stroke. This realization has also lead to the surprising effect that the area ratio between the compression pressure area and the rebound pressure may be set without the prerequisite that the sum of the two areas equals the pilot pressure area. With other words, the compression pressure area may be increased without decreasing the rebound pressure area, and vice versa. This is an advantage since the damping characteristics may be even further improved.

Above-mentioned objects are realized through a valve arrangement for a shock absorber, the valve arrangement comprising a valve housing comprising a first and a second port, a pilot chamber being in fluid communication with the first and/or second port, wherein a pilot pressure is defined by a hydraulic pressure in the pilot chamber. The arrangement further comprises a main valve member being axially movably arranged in the valve housing and being arranged to interact with a main valve seat member in order to restrict a main fluid flow between the first and second ports in response to the pilot pressure acting on the main valve member. Moreover, the main valve seat member is movable between a first compression stroke position and a second rebound stroke position so that, during the compression stroke, the main fluid flow is restricted at a first restriction and a cooperating serially arranged second restriction, and during the rebound stroke, the main fluid flow is restricted at a third restriction.

Hereby, a valve arrangement is provided which has a soft opening during the compression stroke, enabled by the two cooperating radial displaced restrictions being fluidly coupled and serially arranged, and has a regular damping curve during the rebound stroke, enabled by the single third restriction. Thus, by letting the rebound flow going through a third restriction, instead of the two cooperating first and second restrictions used in the compression stroke, the soft opening may be achieved during the compression stroke, and a regular sharper opening may be achieved in a rebound stroke. If the rebound would go through the same restrictions, but in the opposite direction, the damping character would not fulfill the desired requirements.

Moreover, in this solution the area ratio between the compression area and the rebound area may be adjusted without changing the pilot pressure area. In a solution where the main valve seat is fixed, the sum of the compression pressured area and rebound pressured area is always equal to the pilot pressured area. However, with a movable main valve member, it is possible that said sum is greater than the pilot pressured area. Hereby, the valve arrangement may be formed to generate the desired damping forces in both the compression stroke and the rebound stroke without compromising with one of the forces.

In the context of this application, any restrictions "cooperating" should be understood as that they are in some way dependent on each other and work together. E.g. the orifices of two cooperating restrictions may be dependent on the same stroke length. Further, in the context of this application, e.g. two restrictions being "serially arranged" or "arranged in series" should be understood as that the one restriction is provided upstream of the other restriction. That is, fluid will first go through one restriction and then the other restriction, i.e. the fluid is not restricted in two parallel restrictions.

In one embodiment, the movable main valve seat member is a passive member and its axial position is controlled by the fluid pressure and/or the position of the main valve member.

In yet one embodiment, the first restriction is arranged upstream relative the second restriction, in view of the compression fluid flow direction. Thereby, the fluid is first restricted by the first restriction and subsequently restricted by the second restriction, which contributes to the desired soft opening character of the damper.

In one embodiment, the first and second restrictions are at least partly formed as circumferential restrictions. In one embodiment the first restriction is arranged radially inwards relative the second restriction Hereby, when the restrictions are radially displaced and circumferentially formed, the orifice of the first restriction will always be smaller than the orifice of the second restriction when being at least partly opened.

In yet one embodiment, the first restriction has a smaller orifice than the second restriction's orifice when being at least partly opened.

Hereby, when the first and second restrictions are at least partly open, the first restriction is always smaller than the second restriction, which contributes to the desired soft opening character of the damper.

In yet one embodiment, the first restriction and the second restriction is closed when the main valve seat member is in the rebound stroke position. Hereby, the first and second restrictions do not affect the rebound flow, but the third restriction solely restricts the rebound flow.

In one embodiment, the third restriction is closed when the main valve seat member is in the compression stroke position. Hereby, the third restriction does not affect the compression flow, instead only the first and second restrictions restrict the compression flow.

In one embodiment the main valve seat member is always arranged tightly against either the main valve member, against the housing or sandwiched between the main valve member and the housing. Hereby, either the first and second restrictions and/or the third restriction are/is closed at different flows.

In one embodiment the main valve seat member is always arranged tightly against the main valve member during compression stroke.

In one embodiment the main valve seat member is always arranged tightly against the housing during the rebound stroke.

In one embodiment, during compression stroke, when the pressure from the first port is below a threshold pressure value, the main valve seat member is sandwiched between the main valve member and the housing. Further, in compression stroke, when the pressure from the first port is above a threshold pressure value, the main valve seat member is arranged tightly against the main valve member, but lifted from the valve housing. Finally, during the rebound stroke the main valve seat member is arranged tightly against the housing regardless of the pressure level from the second port.

In yet one embodiment, the orifices of the first restriction, second restriction and/or third restriction are controlled by means of the axial position of the main valve member relative the valve housing.

Hereby, the restrictions may be controlled by controlling the axial position of the main valve member. This may be achieved by e.g. combination forces generated from a pilot pressure, an actuator such as a solenoid and/or spring arrangements.

In yet one embodiment, the valve arrangement comprises a fourth restriction being arranged in series with the second restriction. In one embodiment the fourth restriction is arranged in parallel with the first restriction. In one embodiment the fourth restriction is arranged adjacent to the first restriction. All of these embodiments may of course be combined.

In one embodiment, the fourth restriction has a constant orifice being independent of the axial position of the main valve member relative the valve housing. Hereby, a fourth restriction having a set orifice at all times is achieved. Thus, the fourth restriction's orifice is stroke independent. In one embodiment the fourth restriction is arranged adjacent to the first restriction, so that when the first restriction is at least partly open the first and fourth restrictions act as a common restriction. Hereby, the total orifice of the first and fourth restriction may be larger than the restriction orifice of the second restriction in the beginning of a stroke, but smaller than the second restriction orifice in a larger stroke. Hereby, the total restricting character in the compression stroke may be controlled so as to contribute to the desired soft opening character of the damper.

In yet one embodiment the main fluid flow is restricted by the opening between the movable main valve seat member and the main valve member during a rebound stroke, and the main fluid flow is restricted by the opening between the movable main valve seat member and the main valve housing during the compressions stroke.

In yet one embodiment at least one of the valve housing and the movable main valve seat member further comprises a geometrically defined circumferential aperture having a radial inner wall and a radial outer wall, wherein the radial inner wall forms a part of the first restriction and the radial outer wall forms a part of the second restriction.

Hereby, the radial inner and outer wall constitutes the two cooperating restrictions achieving the soft opening in the compression stroke.

In one embodiment the circumferential aperture is formed in the valve housing and the movable valve seat member is sized and adapted to cooperate with the radial inner wall and radial outer wall of the circumferential aperture to form the first restriction and second restriction, so as to restrict the main fluid flow during the compression stroke.

Hereby, the movable valve seat member may be a simple member, such as for example a washer. Thereby, the cost for producing the movable valve seat member may be kept low. Further, since the valve housing already has a rather complex form, it will be formed in a cutting operating machine such as e.g. a turning lathe or a milling cutter or similar, and then forming the additional circumferential aperture will not be as costly as making the aperture in the movable valve seat member. Thus an overall cheaper solution may be provided.

In yet one embodiment the movable main valve seat member is a washer or a shim. Hereby, it is possible to provide the movable valve seat member at a low cost. In the embodiment where the movable valve seat member is a washer it may have a thickness of about 0.5-1.0 mm, preferably about 0.7 mm. In the embodiment where the movable valve seat member is a shim it may have a thickness of about 0.1-0.49 mm, preferably about 0.3 mm.

In one embodiment the moveable main valve seat member is a shim. In one embodiment, said shim has a flexibility allowing its radially outward end to bend at pressures above a predefined threshold during the compression stroke, so as to allow a flow of the damping medium without moving the main valve member.

An advantage with having a shim being the movable valve member, is that during the compression stroke, the movable valve member's radially outwards end may bend when high pressure pulses of pressure are exerted on the movable valve member, so as to allow a passage of damping medium through the second restriction, without having to move the main valve member. Hereby, short and intense pressure increases may be handled without having to move the main valve member. This further increases the smoothness of the damping character.

In one embodiment, the moveable main valve seat member is a shim which is tensioned against the valve housing so that the shims outer end is at least slightly bent, when the first and second restrictions are closed. Hereby, when the movable valve member is flexible any irregularities in the movable valve member may be compensated for through flexibility. Thus, the tolerance range may be increased during production.

In one embodiment the movable valve seat member is a washer or shim closing an upper portion of the circumferential aperture during the rebound stroke. Hereby, the movable valve seat member may prevent any main fluid from flowing past the first and second restrictions.

In yet one embodiment the movable valve seat member is a washer or shim comprising at least three radial steering projections meshing with the main valve housing. Hereby, the washer/shim may be designed to mesh with the housing but to prevent non-axial movements of the movable main valve member. The washer/shim comprises three steering projections so as to restrict the movements of the washer to substantially axial movements. Also, rotational movements around its center axis are permitted. Hereby, any "drawer behavior" may be reduced, i.e. the washer may be prevented to be tilted and locked relative the housing, and thereby it is axially movable at all times.

In yet one embodiment the space between the at least three radial steering projections in the washer/shim form ports for allowing the main fluid flow during the compression stroke.

In one embodiment, the steering projections and intermediate ports are arranged so that a straight line through any of the projection and the center of the washer will also go through an intermediate port. Hereby, jamming is prevented if the washer/shim is tilted (i.e. rotated around an axis being perpendicular to its center axis) since there are no two directly opposite projections along the diameter of the washer.

In yet one embodiment the valve arrangement further comprise a control valve member being movable in an axial direction relative the main valve member in response to an actuating force acting on the control valve member, the control valve member being resiliently loaded in an opposite direction to the actuating force by means of a biasing member, and wherein an interface between the control valve member and the main valve member comprises an opening restricting an bleed flow of the damping medium between the first and second port.

In the context of this application, the bleed flow is to be understood as a flow of damping medium being parallel to the main fluid flow. Further, the bleed flow is substantially lower flow than the maximum main fluid flow.

Hereby, the arrangement may allow a controlled variable bleed flow, which may be a first stage flow of damping medium. In a compression stroke, the flow of damping medium from the first to the second port will substantially go from, in the first stage, being only the bleed flow to mainly be flow through the first and second restriction controlled by the main valve member in a second stage. Hereby, a soft opening between the first and second stage is further improved.

In yet one embodiment, the size of the opening restricting the bleed flow in the interface between the control valve member and the main valve member is controlled by means of the axial position of the control valve member relative the main valve member.

In one embodiment, the main valve seat member comprises a first lifting surface area arranged to hold the main valve seat member in abutment to the main valve member in response to a hydraulic pressure in the first port.

In yet one embodiment, the main valve seat member comprises a second lifting surface area arranged to hold the main valve seat member in abutment to the main valve housing in response to a hydraulic pressure in the second port.

Further, in one embodiment the main valve member comprises a first lifting surface area arranged to axially move the main valve member relative the valve housing in response to a hydraulic pressure in the first port.

In one embodiment the main valve member comprises a second lifting surface area arranged to axially separate the main valve member from the main valve seat member in response to a hydraulic pressure in the second port.

In one embodiment, the control valve member is arranged at least partially within the main valve member. In yet one embodiment, the actuating force acting on the control valve member is generated by a solenoid.

In one embodiment, the pilot pressure is regulated by a pressure regulator integrated in the control valve member.

BRIEF DESCRIPTION OF THE DRAWINGS

Further details and aspect of the present invention will become apparent from the following detailed description with reference to accompanying drawings, in which.

DETAILED DESCRIPTION OF EMBODIMENTS

Figure 1:
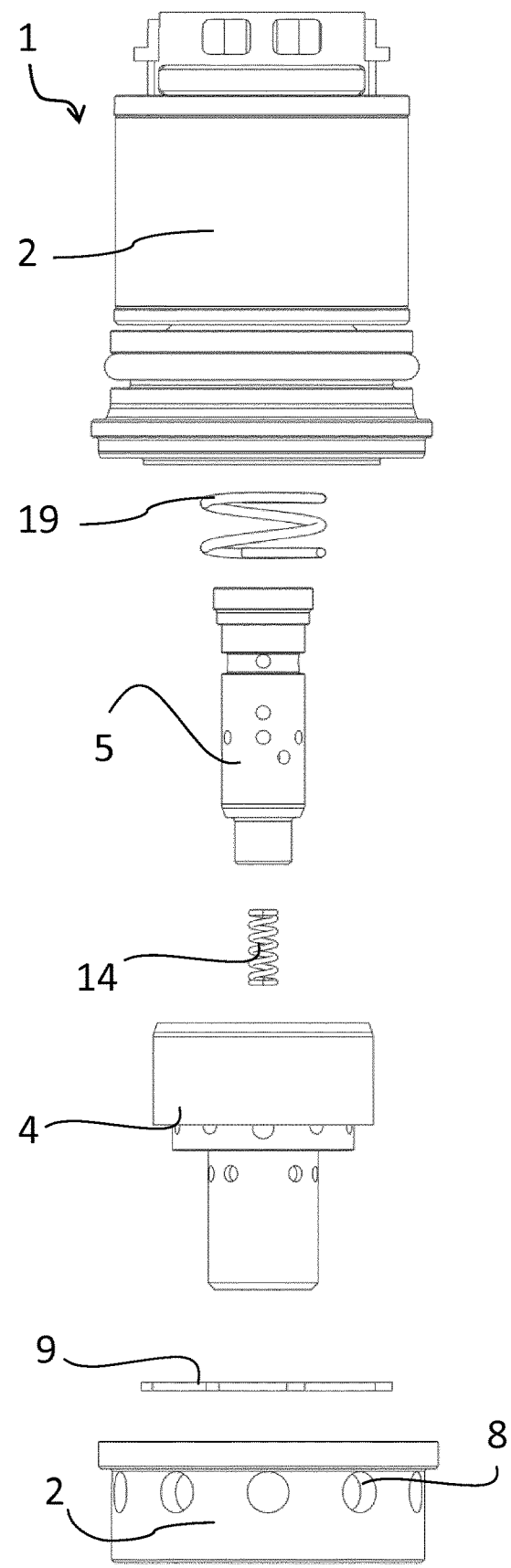
FIG. 1 shows an exploded view of an embodiment of the valve arrangement

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

FIG. 1 shows a cross-sectional exploded view of a valve arrangement. The valve arrangement 1 comprises a valve housing 2. The valve housing has an upper portion at the top of the figure and a lower portion at the bottom of the figure, which are separated in the figure, but when in use they are mechanically coupled, e.g. by press fit or a threaded engagement. The arrangement further comprises a main valve member 4 and a control valve member 5, inside the control valve member 5 there is a pilot valve member 6 (shown in FIG. 2) acting as a pressure regulator. The valve members are biased inside the housing by biasing means 14, 19 (shown as springs). The figure further illustrates the second port 8 in the lower portion of the valve housing 2. Moreover, the arrangement comprises the movable main valve seat member 9, which is further illustrated in the following figures, especially FIG. 4c. Most details in FIG. 1 will be further explained in relation to FIGS. 2-4, where their respective function also will be described. FIG. 1 is mainly included in the application to clarify the form of each component and thereby facilitate the reading and understanding of the application.

Figure 2:
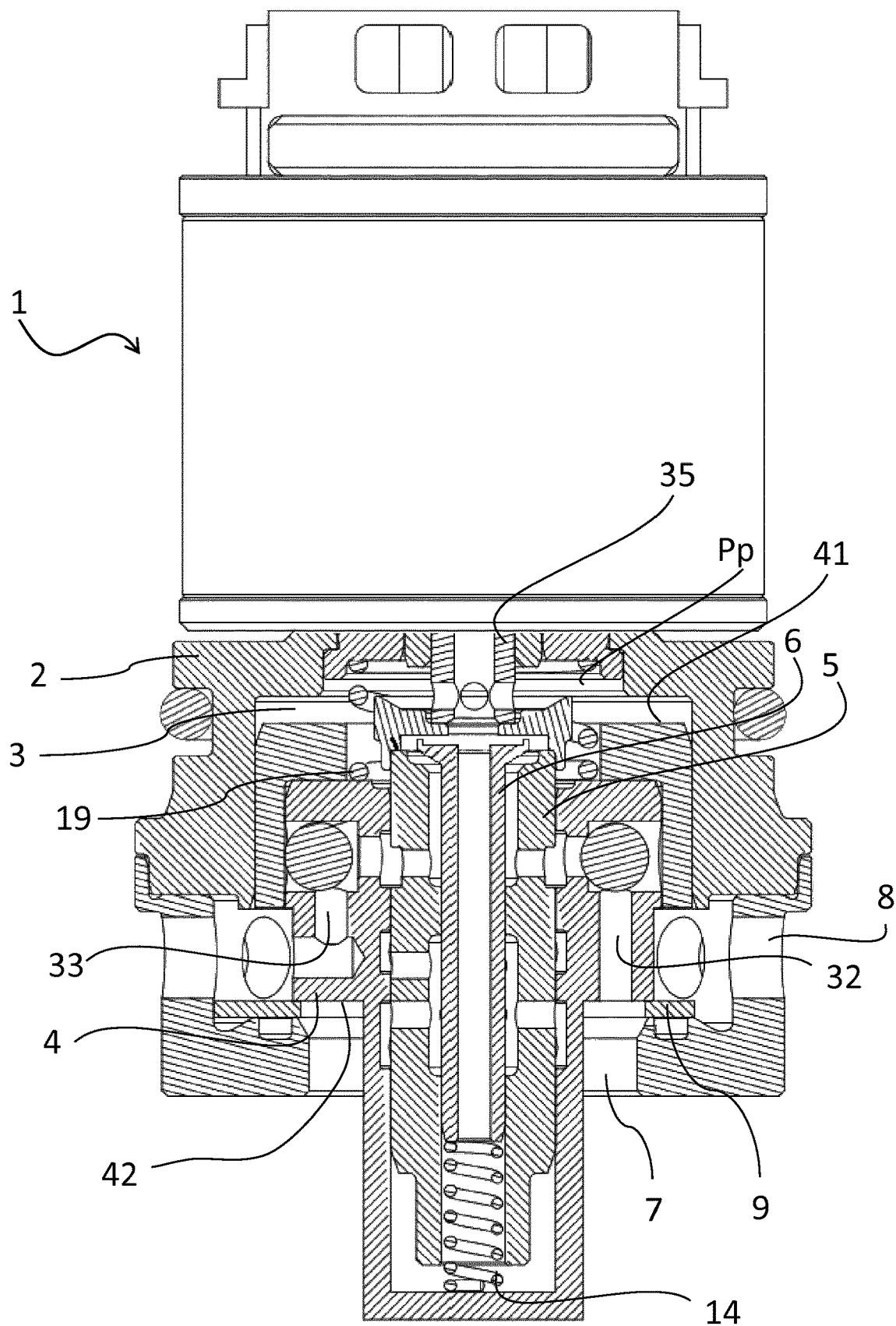
FIG. 2 shows a cross-section of an embodiment when the main valve member is in a closed position to block a main flow from the first port to the second port.
Figure 3A:
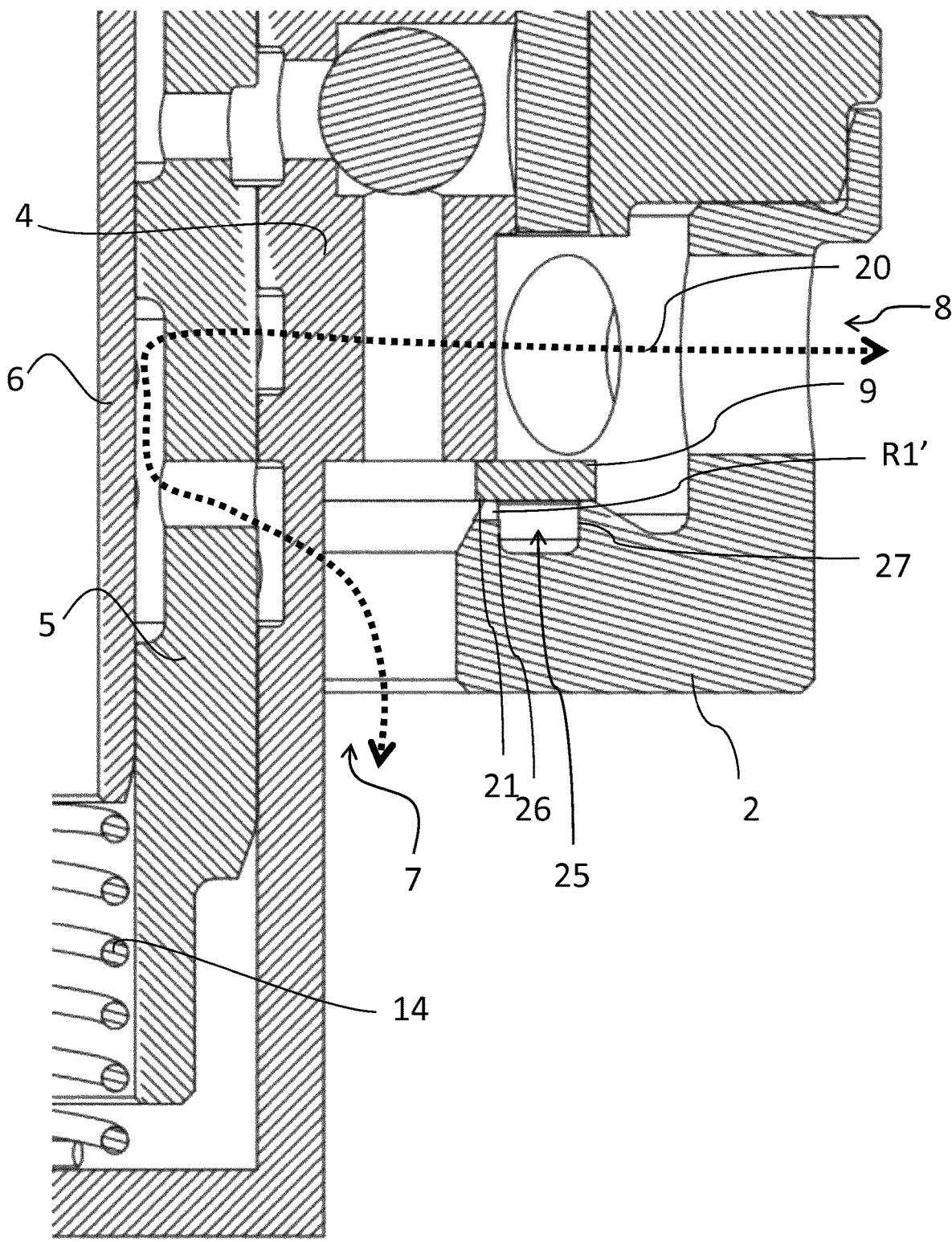
FIG. 3a shows a close-up cross-section of FIG. 2, where the main valve member is in a closed position to block a main flow from the first port to the second port.

FIGS. 2 and 3a shows a cross-section of an embodiment of the valve arrangement 1 when the main valve member 4 is in a closed position to block a main flow (not shown) from the first port 7 to the second port 8, wherein FIG. 3a is a close-up cross-section of FIG. 2. The valve arrangement 1 comprises a valve housing 2, a pilot chamber 3, a main valve member 4, and a control valve member 5. The valve housing 2 comprises a first and a second port 7, 8. In the illustrated embodiment, the first and second ports act as inlet and outlet ports, respectively, for inlet and outlet of hydraulic fluid. The pilot chamber 3 is defined by the space formed between the upper surface 41 of the main valve member and inner walls of the valve housing 2. The pilot chamber 3 is in fluid communication with the first port 7 via a first axial through hole 32 in the main valve member 4 and with the second port 8 via a second axial through hole 33 in the main valve member 4. The pilot pressure Pp acting on the upper surface 41 of the main valve member 4 is defined by a hydraulic pressure in the pilot chamber 3.

The main valve member 4 is axially movably arranged in the valve housing 2 and is arranged to interact with the movable main valve seat member 9 in order to restrict or regulate a pressure in a main fluid flow 10 (shown in FIGS. 3b and 3c) between the first port 7 and the second port 8 in response to a pilot pressure Pp acting on an upper surface 41 of the main valve member 4. In this embodiment, the main valve member 4 is held towards the main valve seat member 9 in a closed position. The main valve member may be resiliently loaded by any spring members or may itself be flexible and/or resilient to achieve a desired resilient loading towards the movable main seat valve member 9.

The control valve member 5 is of a substantially cylindrical shape and is arranged coaxially with and partially within the main valve member. The control valve member 5 is furthermore movable in an axial direction relative the main valve member in response to an actuating force acting on the control valve member. In this embodiment, the actuating force is received by an actuating rod 35. The actuating rod may be an axially movable magnetic member on which a solenoid exerts a force in response to an electric current.

Further, the state shown in FIG. 2 may be derived from that either the pressure from port 7 and/or 8 has not yet reached a threshold value when the main valve member 4 is lifted towards the pilot chamber 3. This threshold value corresponds to when the lifting force generated from the pressure in any one of the first or second port 7, 8 acts on a lifting areas 42, 43 of the main valve member 4 exceed the counter acting force from the pilot pressure Pp in the pilot chamber 3 acting on the upper surface 41 of the main valve member 4. This is further explained in relation to FIGS. 3b and 3c where a regulated main flow 10 is illustrated.

As most clearly illustrated in the close-up shown in FIG. 3a, the main valve member comprises a circumferential aperture 25, having a radial inner wall 26 and a radial outer wall 27. In connection with the radial inner wall 26 there is another aperture forming a fourth restriction R1'. The fourth restriction R1' allows the damping fluid to enter the circumferential aperture 25 so as to pressurize the movable main valve member 9 in response to a pressure in port 7. Further, FIG. 3a illustrates a bleed flow 20 flowing between the first and second ports through an opening in the main valve member 4, into the control valve member 5 and passing along the pilot valve member 6 and then back through the control valve member 5 and the main valve member 4. This bleed flow is a limited flow which is substantially lower flow than the maximum main fluid flow. The regulated bleed flow 20 corresponds to the first stage flow q1 in FIG. 4f, i.e. before the three curves depart from each other. This will be further elaborated in relation to FIG. 4f.

Figure 3B:
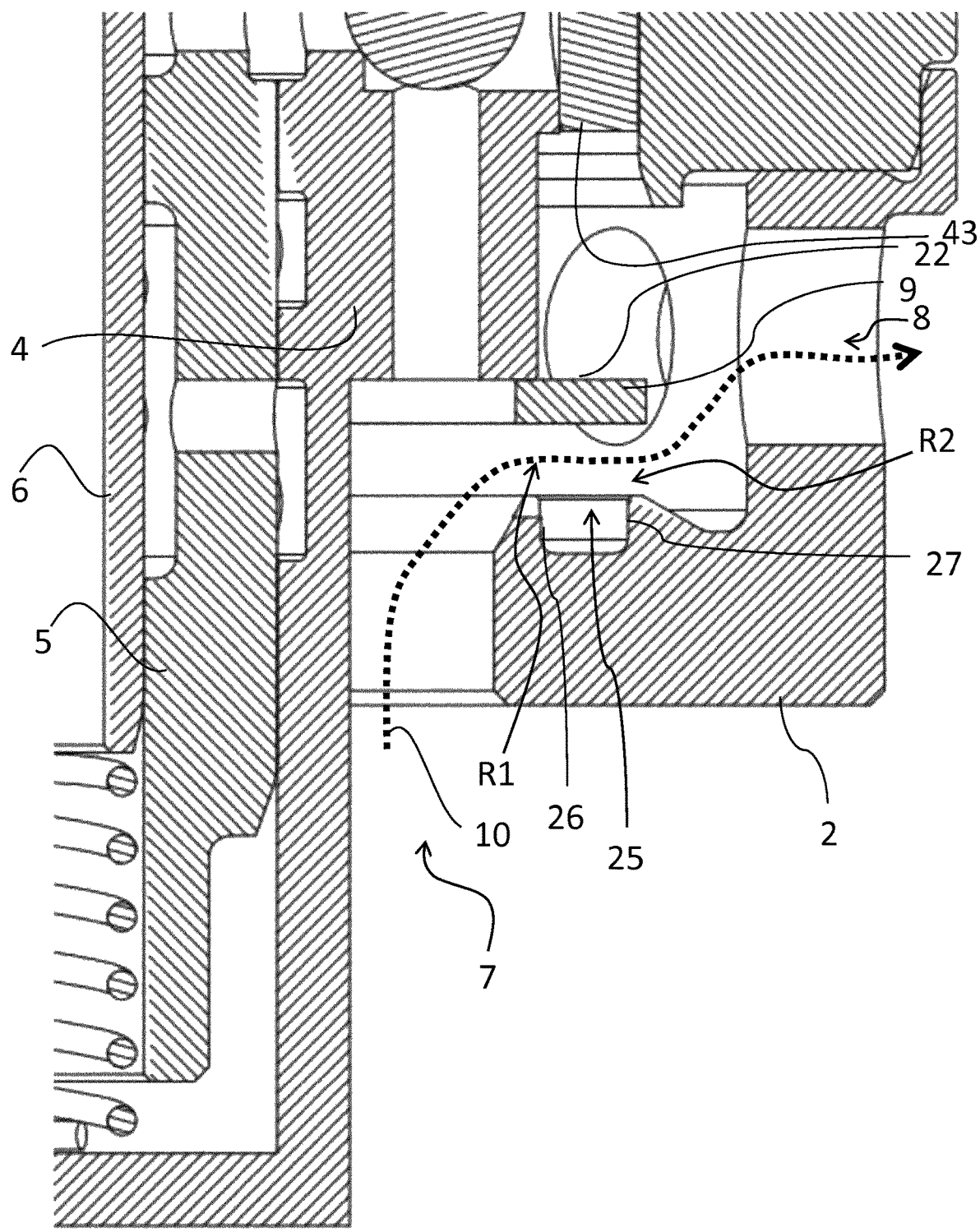
FIG. 3b is a close-up of FIG. 3, but where the main valve member and main valve seat member is in a partly open position to allow a regulated main flow from the first port to the second port, i.e. a flow during compression stroke.
Figure 4A:
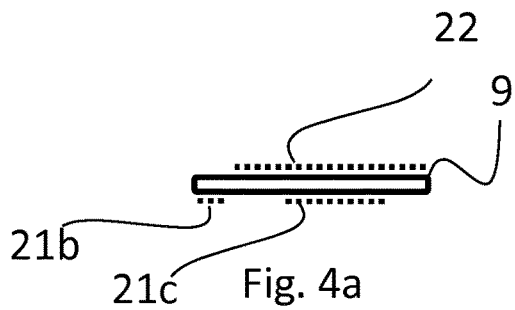
FIG. 4a shows a cross-section of a side portion of the main valve seat member where the lifting surface area during the closed position of the main valve member is illustrated.

FIG. 3b is a close-up of FIG. 2, but where the main valve member 4 and main valve seat member 9 is in a partly open position to allow a regulated main flow 10 from the first port 7 to the second port 8, i.e. a flow during compression stroke. As illustrated, the movable main valve member 9 and main valve member 4 are held together in a position axially displaced relative the valve housing 2 when compared to the closed position in FIGS. 2 and 3a. In this position, a regulated main fluid flow 10 is allowed from the first port 7 to the second port 8, and is restricted by the first restriction R1 plus the fourth restriction R1' first (upstream, closest to the first port) and then restricted by the second restriction R2 downstream of the first restriction R1. The radial inner wall 26 together with the movable valve seat 9 forms a part of the first restriction (R1) and the radial outer wall (27) together with the movable valve seat 9 form a part of the second restriction (R2). In any partly open state the first restriction R1 is smaller than the second restriction R2, since the two restrictions are formed as circumferential restrictions and being radially displaced. Since the second restriction has a larger circumference its orifice will always be larger than the orifice of the first restriction, when formed with a common delimiter upwards (the movable valve seat member 9) and downwards (the radial side walls of the housing). Further, the fourth restriction R1' has a constant opening. Hereby, the sum of the first R1 and fourth R1' restriction is initially larger than the second restriction R2, but as the stroke S increases the second restriction becomes larger than the sum of the first and fourth restriction, this is illustrated in FIGS. 4d and 4e.

Figure 4B:
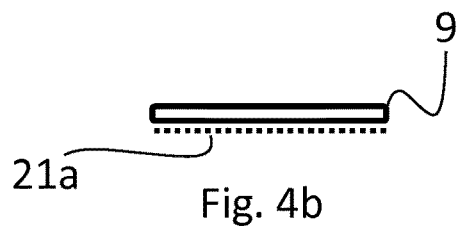
FIG. 4b shows a cross-section of a side portion of the main valve seat member where the lifting surface area during regulated compression stroke is illustrated.

Thus, in FIG. 3b a pressure from the damping fluid in port 7 causes the opening axial displacement of the main valve member 4 (acting on the lifting areas 42 and 43) and the main valve seat member 9 (acting on the lifting area 21a as illustrated in FIG. 4b). The movement is, as earlier explained, dependent on the counteracting pressure from the pilot chamber 3 acting on the main valve member 4. Hereby, a regulated main flow of damping fluid is allowed to flow from the first to the second port 7, 8. This type of regulation corresponds to the second stage flow q1 in FIG. 4f, i.e. after the three curves depart from each other. Since two serial and cooperative restrictions R1 and R2 are used to regulate the flow, a soft opening when going from the first stage q1 to the second stage q2 may be achieved. This will be further elaborated in relation to FIG. 4f as mentioned before.

Figure 3C:
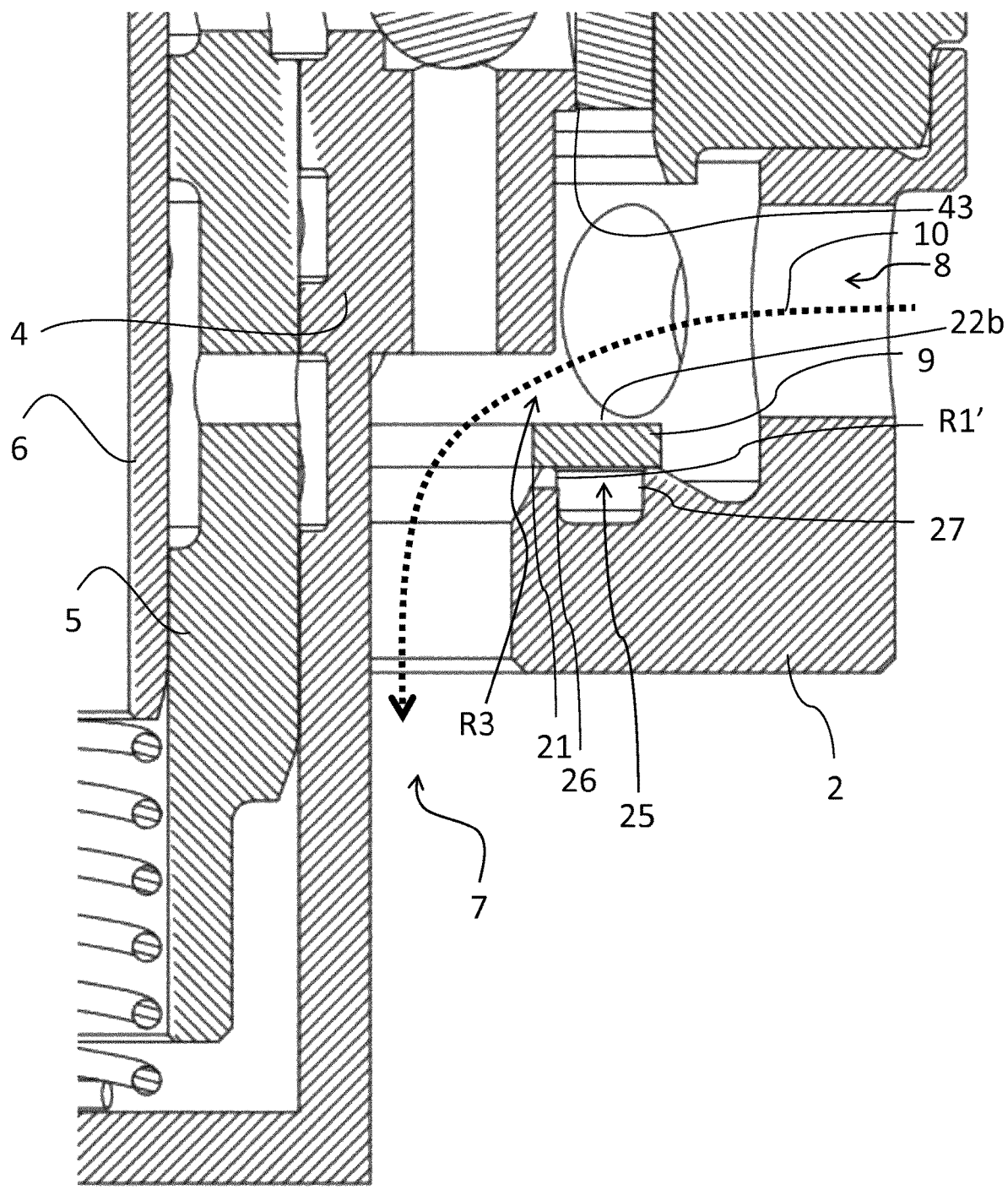
FIG. 3c is a close-up of FIG. 3, but where the main valve member is in a partly open position to allow a regulated main flow from the second port to the first port, i.e. a flow during rebound stroke.

FIG. 3c is also a close-up of the view in FIG. 3, but where the main valve member 4 is in a partly open position to allow a regulated main flow 10 from the second port 8 to the first port 7, i.e. a flow during rebound stroke. When comparing FIG. 3c to FIG. 3b, it is only the movable main valve seat member 9 that has been moved from being arranged tightly against the main valve member 4, to instead being arranged tightly against the valve housing 2. This is achieved through a flow (pressure) of damping from the second port 8 to the first port 7, which acts on the upper surface, being a lifting area 22, of the movable main valve seat member 9 and also acts on the lifting area 43 of the main valve member 4, but in an opposite direction so that the main valve member 4 and the main valve seat member are separated. The pressure in the second port 8 will always keep the main valve seat member 9 pressed against the valve housing 2. Also, depending on the level of pressure, the opening between the main valve member 4 and the main valve seat member 9 constitutes the third restriction R3. The third restriction R3 enables the pressure-regulated flow in rebound stroke.

When comparing FIG. 3b and FIG. 3c, the above-mentioned advantage with having a movable valve seat member 9 and thereby getting a more flexible area pressure ratio between compression pressure area and rebound pressure area may be understood. In the illustrated embodiment the area ratio between the compression area and the rebound area may be adjusted without changing the pilot pressure area. In a solution where the main valve seat is fixed, the sum of the compression pressured area and rebound pressured area is equal to the pilot pressured area. However, with a movable main valve member, it is possible that the sum is greater than the pilot pressured area, since the movable valve seat member is moved and thereby the compression pressure and rebound pressure acts at different surfaces. This allows forming the valve arrangement to generate the desired damping forces in both the compression stroke and the rebound stroke without compromising with one of the forces.

FIGS. 4a and 4b further illustrates the pressurized areas of the movable valve seat member 9. In FIG. 4a the pressurized areas 21b, 21c and 22 corresponds to the area acting on the movable valve seat member 9 when the main valve is closed, as illustrated in FIGS. 2 and 3a. The area 21b corresponds to the portion of the movable valve seat member protruding from the valve housing in a radially inwards direction. The area 21c corresponds to the portion of the movable valve seat member arranged on top of the circumferential aperture 25 in the valve housing. That is, this aperture may be filled with pressurized damping fluid. Further, the area 22 corresponds to the portion of the movable valve seat member 9 extending in a radially outwards direction from the main valve member's radially outer corner. See FIG. 3a.

Further, FIG. 4b shows a cross-section of a side portion of the main valve seat member where the lifting surface area during regulated compression stroke is illustrated. The pressurized area 21a on the movable valve seat member 9 illustrated is when the main valve member is at least partly opened. The area corresponds to the whole lower surface of the movable valve seat member 9.

Figure 4C:
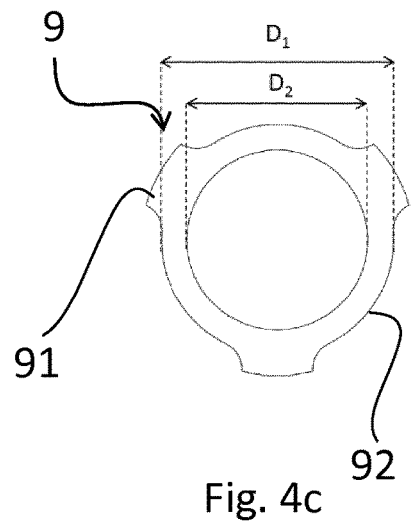
FIG. 4c shows a top view of the main valve seat member.
Figure 4D:
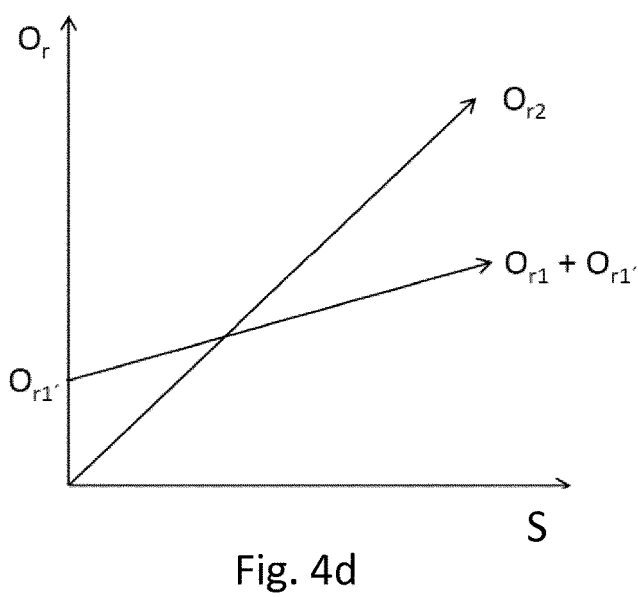
FIG. 4d shows a graph over the orifice openings vs. the stroke length.
Figure 4E:
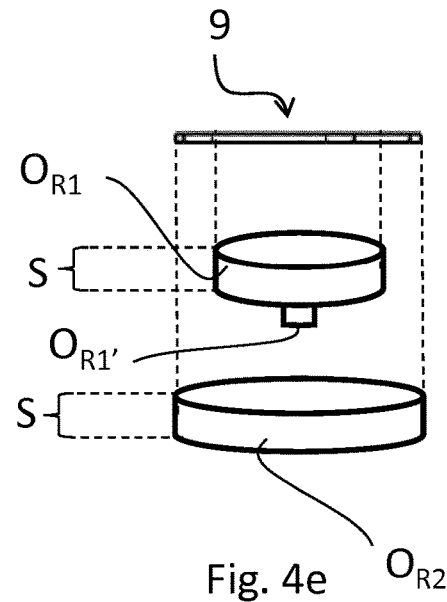
FIG. 4e shows an illustration of the main valve seat member and the first, second and fourth orifices at a given stroke length S.

FIG. 4c illustrates the movable valve seat member 9 from a top view. It is shown that the movable valve seat member 9 is formed as a washer, with an outer diameter D1 and an inner diameter D2. Furthermore, the washer comprises three radial steering projections 91. The steering projections are sized and adapted to mesh with the main valve housing 2. Furthermore, the space between the at least three radial steering projections 91 in the washer forms intermediate ports 92 for allowing the main fluid flow 10 passing from the first 7 to the second port 8 during the compression stroke. The steering projections 91 and intermediate ports 92 in the embodiment are arranged so that not a single steering projection 91 has an opposing steering projection on the other side of the washer. With other words, a straight line through any of the projection 91 and the center of the washer will not go through a second steering 91 projection but instead go through an intermediate port 92. The reason to this design is that jamming of the movable valve seat member 9 may be prevented if it is tilted (i.e. rotated around an axis being perpendicular to its center axis) since there are no two directly opposite projections along the diameter of the washer. It would also be possible to have more radial steering projections, as long as they are distributed along the circumferential of the movable valve seat member 9 so as to avoid jamming if it is tilted.

FIG. 4d shows a graph over the orifice openings $O_{R1}+O_{R1'}$ and $O_{R2}$ as a function of the stroke length S. The first orifice $O_{R1}$ corresponds to the orifice of the first restriction R1. This orifice $O_{R1}$ is also illustrated by the envelope surface of the circle in FIG. 4e, and denoted with $O_{R1}$, which is thus dependent on the stroke length S. The stroke length is the axial distance between the movable valve seat member 9 and the main valve housing 2, when being in a regulated position, see for example in FIG. 3b. The second orifice $O_{R2}$ corresponds to the orifice $O_{R2}$ of the second restriction R2.

This orifice is also illustrated by the envelope surface of the circle in FIG. 4e, and denoted with $O_{R2}$. The fourth orifice $O_{R1'}$ corresponds to the orifice of the forth restriction R1'. This orifice $O_{R1'}$ is also illustrated by a surface in FIG. 4e denoted with $O_{R1'}$, which corresponds to the opening into the circumferential aperture in the main valve housing 2. As already explained above, FIG. 4e shows an illustration of a cross-sectional side-view of the main valve seat member where the first $O_{R1}$, second $O_{R2}$ and fourth $O_{R1'}$ orifices are illustrated at a given stroke length S. From this illustration it is apparent how the first $O_{R1}$ and second $O_{R2}$ orifices vary with the stroke length S, but the fourth $O_{R1'}$ orifice is static.

In the initial phase of the regulated compression stroke, i.e. when R1 and R2 is just opening from a closed position, the restriction will be carried out in the second restriction, which is shown in FIG. 4d, since the orifice of the second restriction R2 is smaller than the orifice of the first and fourth restriction R1+R1', in said initial phase. As soon as the orifice of the second restriction R3 is larger than the combined orifice of the first and fourth restriction R1+R1', the restriction is instead carried out at the first and fourth restrictions.

The size relationships between the orifices of the different restrictions may vary without departing from the inventive concept. By adjusting the orifice size relationships, the intersecting point between "$O_{R1}+O_1$"-curve and the "$O_{R2}$"-curve the shown in FIG. 4d may be moved. The orifice size of $O_{R1'}$ is represented by where the "$O_{R1}+O_{R1'}$"-curve intercepts the Y-axis. The relation between the size of the first and second restrictions' orifices $O_{R1}$ is illustrated by the different inclinations of the two curves in FIG. 4d. Further, by increasing the relative size of the fourth orifice $O_{R1'}$ relative the maximum orifice size of the first orifice $O_{R1}$ the soft opening is prolonged.

The maximum orifice size of the first orifice $O_{R1}$ may be about 50%-95% of the maximum orifice size of the second orifice $O_{R2}$. In one embodiment the maximum orifice size of the first orifice $O_{R1}$ is about 70%-90% of the maximum orifice size of the second orifice $O_{R2}$. In another embodiment maximum orifice size of the first orifice $O_{R1}$ is about 75%-85% of the maximum orifice size of the second orifice $O_{R2}$.

The orifice size of the fourth orifice $O_{R1'}$ may be about 0.1%-10% of the maximum orifice size of the first orifice $O_{R1}$. In one embodiment the orifice size of the fourth orifice $O_{R1'}$ is about 0.3%-3% of the maximum orifice size of the first orifice $O_{R1}$. In another embodiment the orifice size of the fourth orifice $O_{R1'}$ is about 0.5%-1% of the maximum orifice size of the first orifice $O_{R1}$.

Further, as the graph in FIG. 4d illustrates, the combined first and fourth orifices $O_{R1}$ and $O_{R1'}$ are larger than the second orifice $O_{R2}$ during the initial stroke, but at one point, the second orifice $O_{R2}$ is larger than the combined first and fourth orifices $O_{R1}$ and $O_{R1'}$, and increases faster during the same stroke length.

Figure 4F:
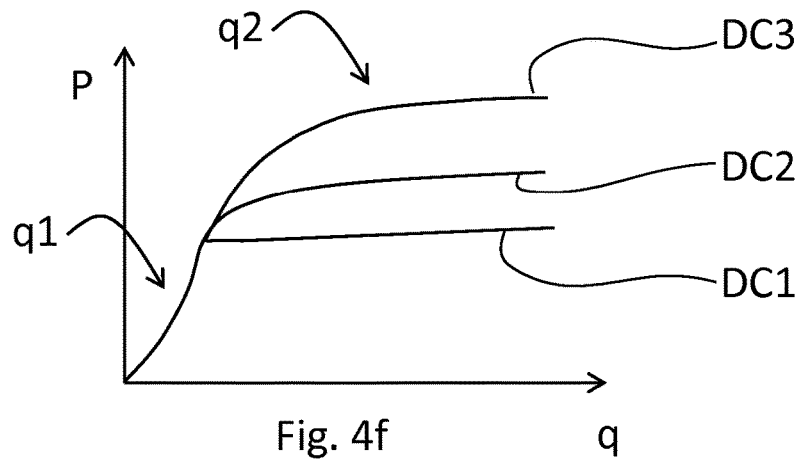
FIG. 4f shows a graph over the flow (q) vs. Pressure (P) in three damping characteristics scenarios.

Finally, FIG. 4f shows graph over the pressure P as a function of the flow q in a compression stroke, in three different dampers with different damping characteristics. All functions comprise a common first stage q1, where a regulated bleed flow is illustrated. In the second stage q2, starting from where the three functions separated from each other, corresponds to a pressure regulated main fluid flow. The first damping character DC1, illustrates a sharp opening, which is the common behaviour in 2-way valves today. The second and third functions DC2 and DC3, both illustrate a soft opening, i.e. when the solution described in this application is used. The difference between the two is the orifice size of the fourth restriction R1'. That is, by altering the size of the fourth restriction's orifice the character of the soft opening may be adjusted. In the second function DC2, the fourth orifice $O_{R1'}$ is smaller than in the third function DC3 which consequently has a larger orifice $O_{R1''}$.

Although exemplary embodiments of the present invention have been shown and described, it will be apparent to the person skilled in the art that a number of changes and modifications, or alterations of the invention as described herein may be made. Moreover, the different embodiments described above may be combined in different ways without departing from the scope of the inventive concept. Thus, it is to be understood that the above description of the invention and the accompanying drawing is to be regarded as a non-limiting example thereof and that the scope of the invention is defined in the appended patent claims.

The invention claimed is:

1. A valve arrangement for a shock absorber, said valve arrangement comprising:
    a valve housing comprising a first and a second port;
    a pilot chamber being in fluid communication with said first and/or second port, wherein a pilot pressure is defined by a hydraulic pressure in said pilot chamber; and
    a main valve member being axially movably arranged in said valve housing and being arranged to interact with a main valve seat member in order to restrict a main fluid flow between said first and second ports in response to said pilot pressure acting on said main valve member;
wherein
    the main valve seat member is movable between a first compression stroke position and a second rebound stroke position so that, during the compression stroke, the main fluid flow is restricted at a first restriction and a cooperating serially arranged second restriction, and, during the rebound stroke, the main fluid flow is restricted at a third restriction,
    an orifice of said first restriction and an orifice of the second restriction is controlled by the axial position of the main valve member relative the valve housing and wherein
    at least one of said valve housing and said movable main valve seat member further comprises a geometrically defined circumferential aperture having a radial inner wall and a radial outer wall, wherein the radial inner wall forms a part of the first restriction and the radial outer wall forms a part of the second restriction.

2. The valve arrangement according to claim 1, wherein the first restriction is arranged upstream relative the second restriction, in view of the compression fluid flow direction.

3. The valve arrangement according to claim 1, wherein the first restriction has a smaller orifice than the second restriction's orifice when being at least partly opened.

4. The valve arrangement according to claim 1, wherein at least one of the first restriction and the second restriction is closed when said main valve seat member is in said rebound stroke position.

5. The valve arrangement according to claim 1, wherein the third restriction is closed when said main valve seat member is in said compression stroke position.

6. The valve arrangement according to claim 1, wherein the orifice of said third restriction is also controlled by the axial position of the main valve member relative the valve housing.

7. The valve arrangement according to claim 1, comprising a fourth restriction being arranged in series with the second restriction.

8. The valve arrangement according to claim 7, wherein the fourth restriction has a constant orifice being independent of the axial position of the main valve member relative the valve housing.

9. The valve arrangement according to claim 1, wherein said circumferential aperture is formed in said valve housing and the movable valve seat member is sized and adapted to cooperate with the radial inner wall and radial outer wall of said circumferential aperture to form the first restriction and second restriction, so as to restrict the main fluid flow during the compression stroke.

10. The valve arrangement according to claim 9, wherein the movable valve seat member is a washer or shim.

11. The valve arrangement according to claim 1, wherein the movable valve seat member is a washer or shim closing an upper portion of said circumferential aperture during the rebound stroke.

12. The valve arrangement according to claim 1, wherein the movable valve seat member is a washer or shim comprising at least three radial steering projections meshing with said main valve housing.

13. The valve arrangement according to claim 12, wherein the space between said at least three steering radial projections in said washer or shim forms intermediate ports for allowing the main fluid flow during the compression stroke.

14. The valve arrangement according to claim 1, further comprising a control valve member being movable in an axial direction relative said main valve member in response to an actuating force acting on said control valve member, said control valve member being resiliently loaded in an opposite direction to said actuating force by means of a biasing member, and wherein an interface between said control valve member and said main valve member comprises an opening restricting a bleed flow of the damping medium between the first and second port.

15. A valve arrangement for a shock absorber, said valve arrangement comprising:
a valve housing comprising a first and a second port~
a pilot chamber being in fluid communication with said first and/or second port, wherein a pilot pressure is defined by a hydraulic pressure in said pilot chamber; and
a main valve member being axially movably arranged in said valve housing and being arranged to interact with a main valve seat member in order to restrict a main fluid flow between said first and second ports in response to said pilot pressure acting on said main valve member;
wherein
the main valve seat member is movable between a first compression stroke position and a second rebound stroke position so that, during the compression stroke, the main fluid flow is restricted at a first restriction and a cooperating serially arranged second restriction, and, during the rebound stroke, the main fluid flow is restricted at a third restriction, and wherein at least one of said valve housing and said movable main valve seat member further comprises a geometrically defined circumferential aperture having a radial inner wall and a radial outer wall, wherein the radial inner wall forms a part of the first restriction and the radial outer wall forms a part of the second restriction, and
wherein
said circumferential aperture is formed in said valve housing and the movable valve seat member is sized and adapted to cooperate with the radial inner wall and radial outer wall of said circumferential aperture to form the first restriction and second restriction, so as to restrict the main fluid flow during the compression stroke.

16. A valve arrangement for a shock absorber, said valve arrangement comprising:
a valve housing comprising a first and a second port;
a pilot chamber being in fluid communication with said first and/or second port, wherein a pilot pressure is defined by a hydraulic pressure in said pilot chamber; and
a main valve member being axially movably arranged in said valve housing and being arranged to interact with a main valve seat member in order to restrict a main fluid flow between said first and second ports in response to said pilot pressure acting on said main valve member;
wherein
the main valve seat member is movable between a first compression stroke position and a second rebound stroke position so that, during the compression stroke, the main fluid flow is restricted at a first restriction and a cooperating serially arranged second restriction, and, during the rebound stroke, the main fluid flow is restricted at a third restriction, and wherein at least one of said valve housing and said movable main valve seat member further comprises a geometrically defined circumferential aperture having a radial inner wall and a radial outer wall, wherein the radial inner wall forms a part of the first restriction and the radial outer wall forms a part of the second restriction, and wherein
the movable valve seat member is a washer or shim closing an upper portion of said circumferential aperture during the rebound stroke.

* * * * *